(12) United States Patent
Benhase et al.

(10) Patent No.: US 7,958,310 B2
(45) Date of Patent: Jun. 7, 2011

(54) APPARATUS, SYSTEM, AND METHOD FOR SELECTING A SPACE EFFICIENT REPOSITORY

(75) Inventors: Michael Thomas Benhase, Tucson, AZ (US); Shachar Fienblit, Ein Ayala (IL); Yu-Cheng Hsu, Tucson, AZ (US); Matthew Joseph Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 12/038,557

(22) Filed: Feb. 27, 2008

(65) Prior Publication Data
US 2009/0216954 A1 Aug. 27, 2009

(51) Int. Cl.
*G06F 12/12* (2006.01)
(52) U.S. Cl. ....................................... 711/133
(58) Field of Classification Search .................. None
See application file for complete search history.

(56) References Cited

U.S. PATENT DOCUMENTS

| 5,574,952 | A * | 11/1996 | Brady et al. ............... 710/68 |
| 6,988,110 | B2 * | 1/2006 | Boyd et al. ................. 707/805 |
| 7,069,402 | B2 | 6/2006 | Coulter et al. ............. 711/162 |
| 7,133,989 | B2 | 11/2006 | Burton et al. .............. 711/162 |
| 7,146,474 | B2 | 12/2006 | Nguyen et al. ............. 711/162 |
| 2002/0032835 | A1 * | 3/2002 | Li et al. ..................... 711/114 |
| 2004/0172491 | A1 * | 9/2004 | Cavallo et al. .............. 710/33 |
| 2005/0071599 | A1 * | 3/2005 | Modha et al. .............. 711/170 |
| 2005/0081006 | A1 | 4/2005 | Shackelford et al. ....... 711/162 |
| 2005/0251634 | A1 | 11/2005 | Burton et al. .............. 711/162 |

\* cited by examiner

*Primary Examiner* — Duc T Doan
(74) *Attorney, Agent, or Firm* — Kunzler Needham Massey & Thorpe

(57) ABSTRACT

An apparatus, system, and method are disclosed for selecting a space efficient repository. A cache receives write data. A destage module destages the data sequentially to a coarse grained repository such as a stride level repository and destages a directory entry for the data to a coarse grained directory such as a stride level directory if the data satisfies a repository policy. In addition, the destage module destages the data to a fine grained repository such as a track level repository overwriting an existing data instance and destages the directory entry to a fine grained directory such as a track level directory if the data does not satisfy the repository policy.

19 Claims, 6 Drawing Sheets

500

| File 0 - Data Track 0 |
| 505a |
| File 0 - Data Track 2 |
| 505c |
| File 0 - Data Track 1 |
| 505b |
| File 0 - Data Track 3 |
| 505b |

| File 2 - Data Track 5 |
| 610 |
| File 3 - Data Track 9 |
| 615a |
| File 1 - Data Track 6 |
| 605 |
| File 3 - Data Track 8 |
| 615d |

FIG. 6

APPARATUS, SYSTEM, AND METHOD FOR SELECTING A SPACE EFFICIENT REPOSITORY

BACKGROUND OF THE INVENTION

1. Field of the Invention

This invention relates to selecting a repository and more particularly relates to selecting a space efficient repository.

2. Description of the Related Art

Data storage devices store increasing amounts of critical data for organizations and individuals. The data storage devices may be hard disk drives, optical storage devices, holographic storage devices, semiconductor storage devices, and micromechanical storage devices. In one embodiment, data is written to a controller. The controller may destage the data to a storage device. As used herein, destage refers to encoding the data on the storage device. The controller may also stage the date from the storage device and communicate the data to a host. As used herein, stage refers to retrieving data from a storage device.

Because of the value of the data, the data may be redundantly stored on a plurality of storage devices so that if a storage device is lost, the data may still be recovered. For example, a data storage system may employ a redundant array of independent disks (RAID) to store data on a plurality of hard disks. The data may be divided into a plurality of portions of varying granularity such as coarse grained and fine grained. Each portion may be written as a strip to a different hard disk. As used herein, a strip refers to a portion of data written to one hard disk. A strip typically comprises a fixed number of fine grained structures such as tracks, data blocks, or the like. In addition, parity data may be calculated for the data and the parity data written to a hard disk. A group of strips that share parity data comprise a coarse grained structure such as a stride.

Unfortunately, when only a few tracks of a data set are modified, the data storage system must still calculate parity data for the data set before the data blocks are written to the storage device. Data sets with a relatively small number of modified tracks to be destaged are referred to herein as random data. As a result, the data storage system may accumulate data blocks substantially equivalent to a stride in a cache before writing the data blocks sequentially to the storage devices. However, the frequent destaging of random data may consume excessive storage device space.

SUMMARY OF THE INVENTION

From the foregoing discussion, there is a need for an apparatus, system, and method that select a space efficient repository. Beneficially, such an apparatus, system, and method would select an efficient repository for storing data.

The present invention has been developed in response to the present state of the art, and in particular, in response to the problems and needs in the art that have not yet been fully solved by currently available redundant storage methods. Accordingly, the present invention has been developed to provide an apparatus, system, and method for selecting a space efficient repository that overcome many or all of the above-discussed shortcomings in the art.

The apparatus for selecting a repository is provided with a plurality of modules configured to functionally execute the steps of receiving write data, destaging the data sequentially to a coarse grained repository, or destaging the data to a fine grained repository. These modules in the described embodiments include a cache and a destage module.

The cache receives write data. The destage module destages the data sequentially to the coarse grained repository and destages a directory entry for the data to a coarse grained directory if the data satisfies a repository policy. In addition, the destage module destages the data to the fine grained repository overwriting an existing data instance and destages the directory entry to a fine grained directory if the data does not satisfy the repository policy.

A system of the present invention is also presented for selecting a repository. The system may be embodied in a data storage system. In particular, the system, in one embodiment, includes a plurality of storage devices and a controller. The controller includes a cache and a destage module.

The storage devices store data. In addition, the storage devices are organized as a stride level repository and a track level repository. The controller manages the storage devices.

The cache receives write data. The destage module destages the data sequentially to the stride level repository and destages a directory entry for the data to a stride level directory if the data satisfies a repository policy. In addition, the destage module destages the data to the track level repository overwriting an existing data instance and destages the directory entry to a track level directory if the data does not satisfy the repository policy.

A method of the present invention is also presented for selecting a repository. The method in the disclosed embodiments substantially includes the steps to carry out the functions presented above with respect to the operation of the described apparatus and system. In one embodiment, the method includes receiving write data, destaging the data sequentially to a coarse grained repository, or destaging the data to a fine grained repository.

A cache receives write data. A destage module destages the data sequentially to the coarse grained repository and destages a directory entry for the data to a coarse grained directory if the data satisfies a repository policy. In addition, the destage module destages the data to the fine grained repository overwriting an existing data instance and destages the directory entry to a fine grained directory if the data does not satisfy the repository policy.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention selects either a coarse grained repository or a fine grained repository to receive destaged data. In addition, the present invention may support efficient storage and retrieval of the data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a schematic block diagram illustrating one embodiment of cache data of the present invention; and FIG. 6 is a schematic block diagram illustrating one alternate embodiment of cache data of the present invention.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
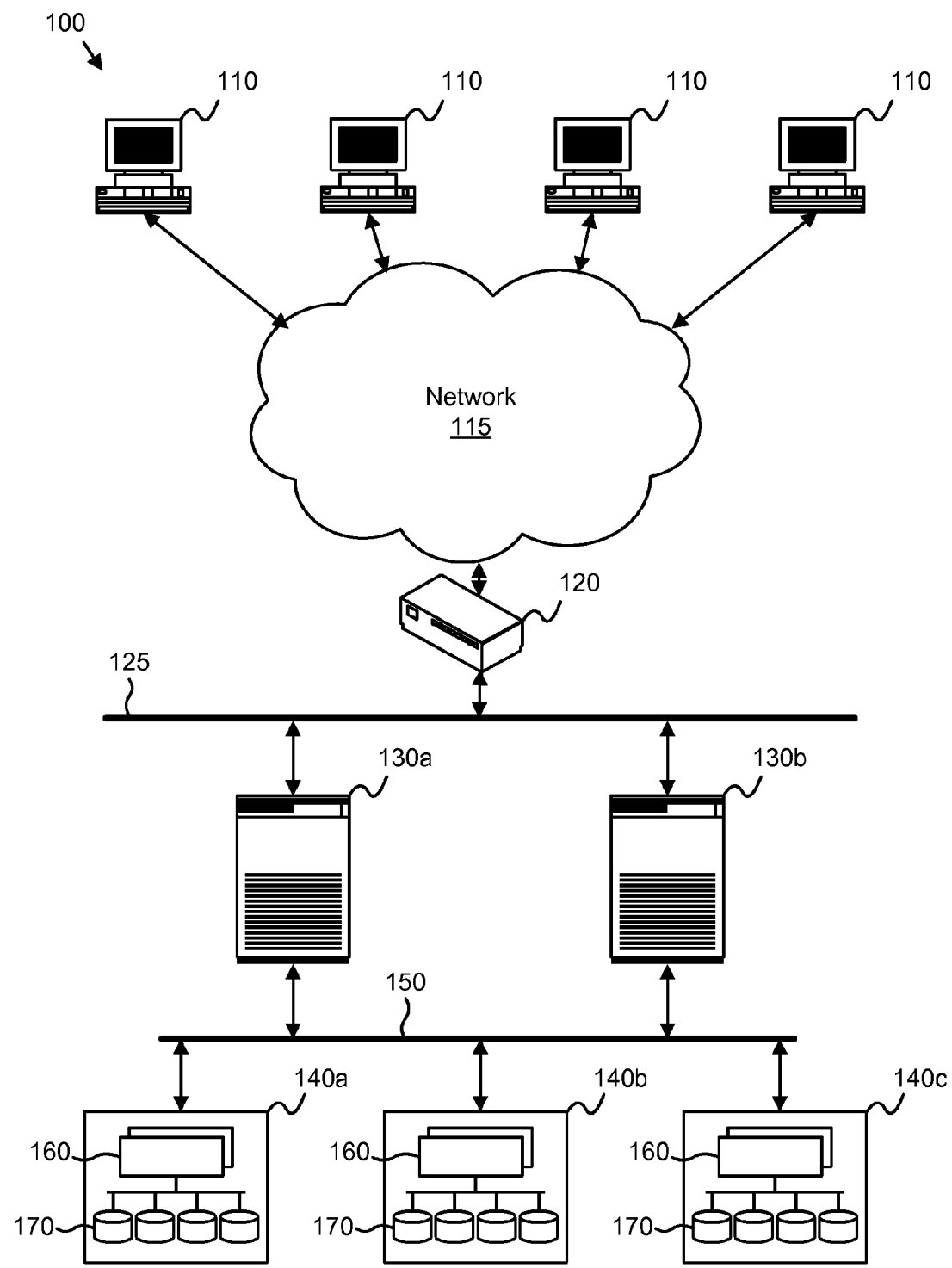
FIG. 1 is a schematic block diagram illustrating one embodiment of a data storage system in accordance with the present invention.

FIG. 1 is a schematic block diagram illustrating one embodiment of a data storage system 100 in accordance with the present invention. The system 100 includes one or more client computers 110, a network 115, a router 120, an internal network 125, one or more servers 130, a storage communications channel 150, and one or more storage subsystems 140.

As used herein, the client computers 110 are referred to as clients 110. The servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the system 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. In addition, the storage devices 170 may also be configured as a redundant array of independent disks (RAID).

In one embodiment, the system 100 provides data storage and data manipulation services for the clients 110. For example, a client 110 may access data stored on a storage device 170 of a storage subsystem 140 by communicating a request through the network 115, the router 120, the internal network 125, a server 130, and the storage communications channel 150 to a controller 160 for the storage device 170. The controller 160 may retrieve the data from the storage device 170 and communicate the data to the client 110.

The network 115 connecting the clients 110 and the servers 130 may be selected from a local area network (LAN), a wide area network (WAN), the Internet, an Ethernet network, a token ring network, or the like. The network 115 may comprise one or more nodes that may provide one or more physical and/or logical paths for transferring the data. The internal network 125 and the storage communications channel 150 may be for example a LAN, a WAN or the like.

In one embodiment, the storage devices 170 store data redundantly. Thus if the storage device 170 fails, client data can be recovered from the other storage devices 170. The present invention organizes a plurality of repositories on the storage devices 170 and selects a repository to improve the performance of the storage devices 170 as will be described hereafter.

Figure 2A:
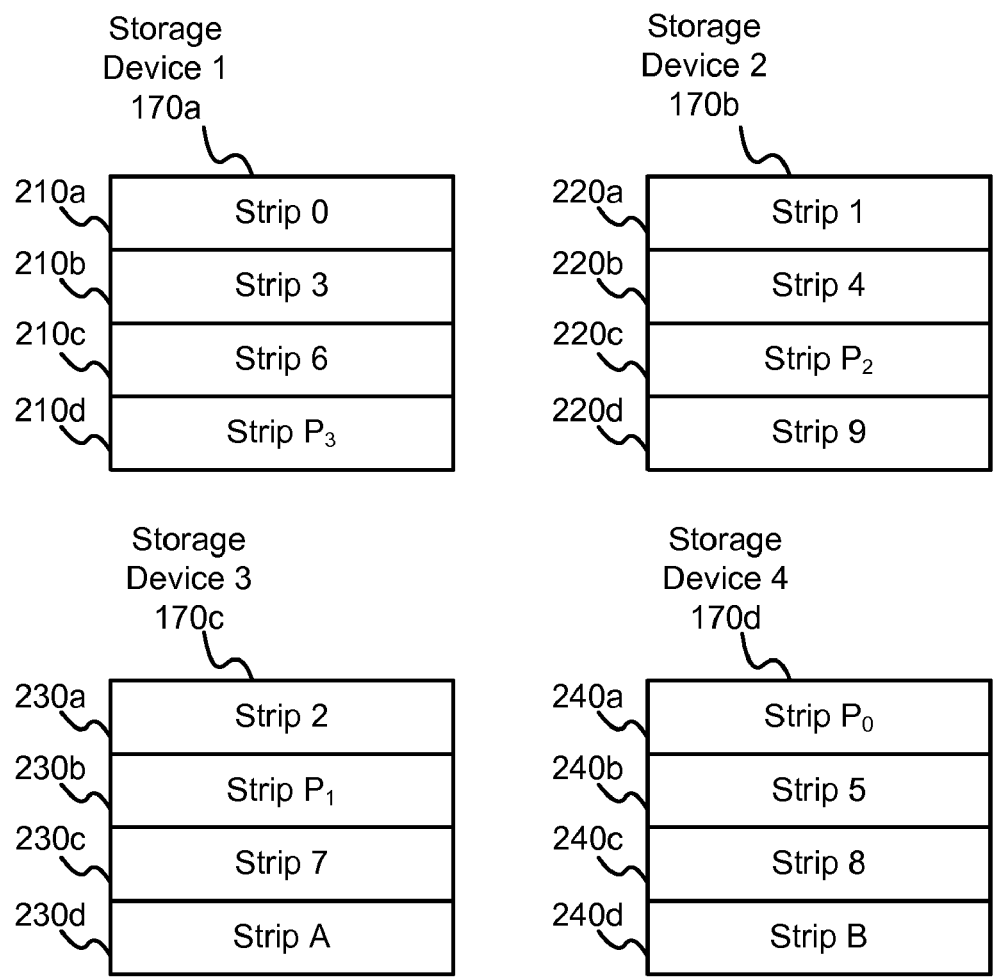
FIG. 2A is a schematic block diagram illustrating one embodiment of storage devices of the present invention.

FIG. 2A is a schematic block diagram illustrating one embodiment of storage devices 170 of the present invention. The storage devices 170 are the storage devices of FIG. 1. The description of the storage devices 170 refers to elements of FIG. 1, like numbers referring to like elements. Four storage devices 170 are shown, although any number of storage devices 170 may be employed.

Each storage device 170 is organized with a plurality of strips 210, 220, 230, 240. For simplicity, each storage device 170 is shown with only four strips 210, 220, 230, 240, although a storage device 170 may be organized as any number of strips 210, 220, 230, 240.

In one embodiment, client data may be destaged to each of the four storage devices 170. For example, a controller 160 may destage the data to strip 0 210a of the storage device 1 170a, strip 1 220a of storage device 2 170b, and strip 2 230a of storage device 3 170c. The controller 160 may further calculate parity data from the data and destage the parity data to strip $P_0$ 240a of storage device 4 170d as is well known to those of skill in the art. A group of strips that share parity data is configured as a stride. For example, strip 0 210a, strip 1, 220a, strip 2, 230a, and strip $P_0$ 240a may form a first stride, strip 3 210b, strip 4 220b, strip 5, 240b, and strip $P_1$ 230b may form a second stride, strip 6 210c, strip 7 230c, strip 8 240c and strip $P_2$ 220c may form a third stride, and stripe 9 220d, strip A 230d, strip B 240d, and strip $P_3$ 210d may form a fourth stride.

If storage device 3 170c fails, the data of strip 2 230a may be recovered from strip 0 210a, strip 1 220a, and strip $P_0$ 240a as is well known to those of skill in the art. Unfortunately, each time data is modified, the parity data must be recalculated and the modified data and parity data destaged to a stride. Thus, frequent small modifications to data may consume significant bandwidth of the data storage system 100.

Figure 2B:
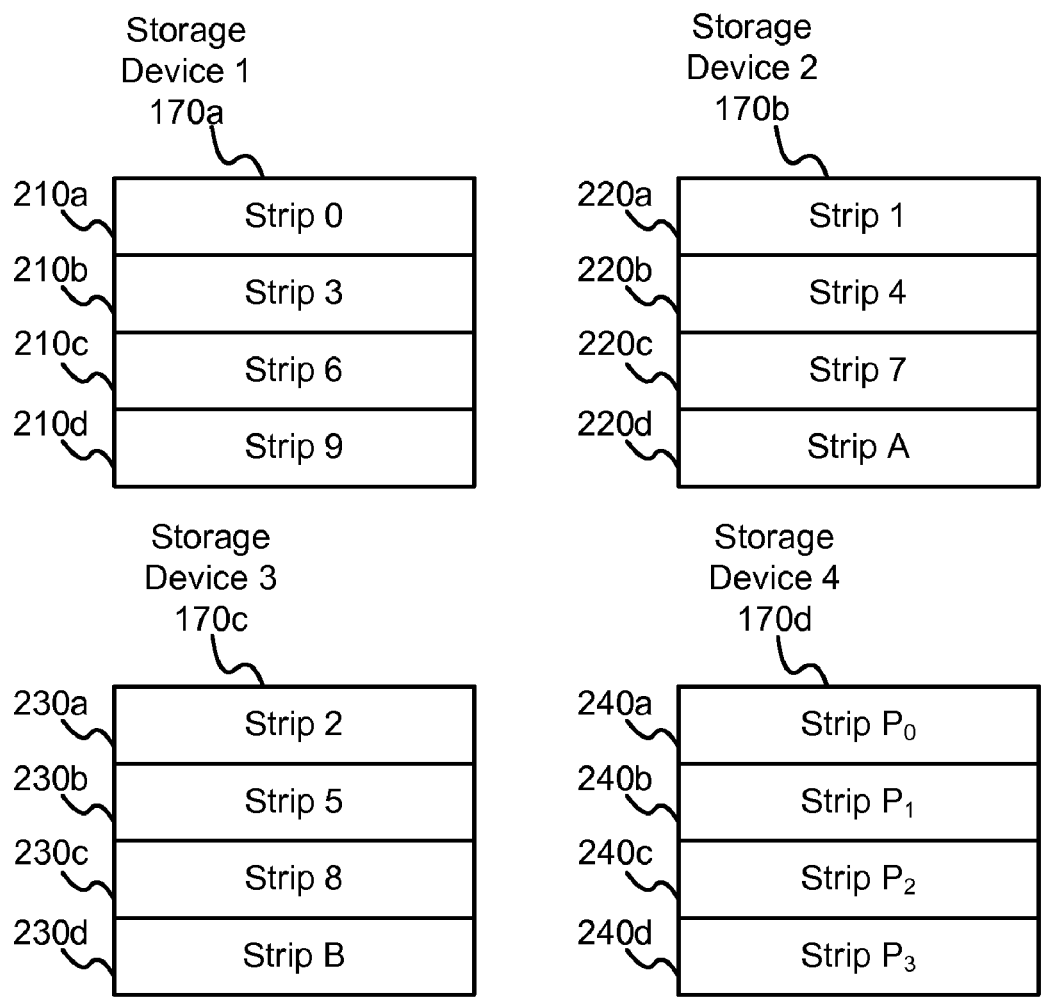
FIG. 2B is a schematic block diagram illustrating one alternate embodiment of storage devices of the present invention.

FIG. 2B is a schematic block diagram illustrating one alternate embodiment of storage devices 170 of the present invention. The storage devices 170 of FIG. 2A are shown. However, storage devices 1-3 170a-c store the client data, while storage device 4 170d stores only parity data. In one embodiment, strip 0 210a, strip 1, 220a, strip 2 230a, and strip $P_0$ 240a form a first stride, strip 3 210b, strip 4, 220b, strip 5 230b, and strip $P_1$ 240b form a second stride, strip 6 210c, strip 7, 220c, strip 8 230c, and strip $P_2$ 240c form a third stride, and strip 9 210d, strip A, 220d, strip B 230d, and strip $P_3$ 240d form a fourth stride.

As with the storage devices 170 of FIG. 2A, data may be recovered if any of the storage devices 170 fail. There is also a bandwidth penalty for recalculating the parity data each time data is destaged to the storage devices 170. The present invention destages redundant data while reducing the bandwidth penalty and efficiently using storage space as will be described hereafter.

Figure 3:
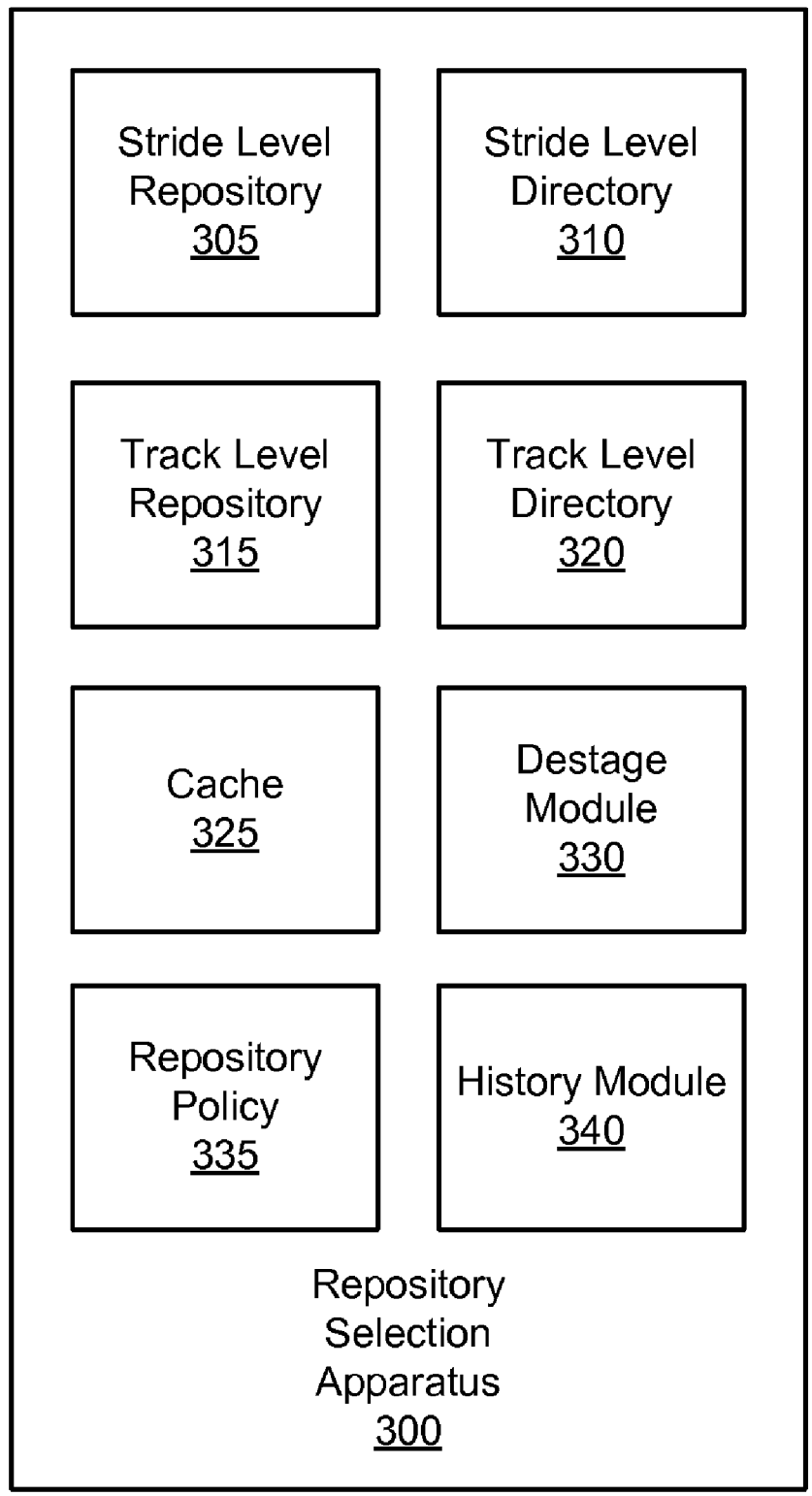
FIG. 3 is a schematic block diagram illustrating one embodiment of a repository selection apparatus of the present invention.

FIG. 3 is a schematic block diagram illustrating one embodiment of a repository selection apparatus 300 of the present invention. The apparatus 300 may be embodied in one or more controllers 160 of FIG. 1. The description of the apparatus 300 refers to elements of FIGS. 1-2B, like numbers referring to like elements. The apparatus 300 includes a coarse grained repository, a coarse grained directory, a fine grained repository, a fine grained directory, a cache 325, a destage module 330, a repository policy 335, and a history module 340. A stride level repository 305 is used herein as exemplary of the coarse grained repository, a stride level directory 310 is used herein as exemplary of the coarse grained directory, a track level repository 315 is used herein as exemplary of the fine grained repository, and a track level directory 320 is used herein as exemplary of the fine grained directory. However, one of skill in the art will recognize that the present invention may be practiced with other coarse grained and fine grained data storage organizations and structures.

The stride level repository 305 comprises a plurality of strides. In one embodiment, an administrator assigns a specified number of strides to the stride level repository 305. Alternatively, the controller 160 dynamically adds strides to and removes strides from the stride level repository 305. For example, the controller 160 may add ten thousand (10,000) strides to the stride level repository 305 if a number of free strides falls below a specified threshold.

The stride level directory 310 stores one or more entries for each data set stored in this stride level repository 305. For example, a first data set may be stored on a first stride with three strips 210a, 220a, 230a along with parity data stored on a fourth strip 240a. The stride level directory 310 may store an entry specifying a location for each strip 210a, 220a, 230a, 240a storing data and/or parity data. In one embodiment, the entries of the stride level directory 310 are destaged to a stride of a storage device 170. Alternatively, the entries of the stride level directory 310 are stored in semiconductor memory of the controller 160.

The track level repository 315 also comprises a plurality of strides. The administrator may assign a specified number of strides to the track level repository 315. Alternatively, the controller 160 may dynamically add strides to and remove stride from the track level repository 315.

The track level directory 320 stores one or more entries for each data set stored in the track level repository 315. For example, a second data set may be destaged to three strips 210b, 220b, 230b of a second stride with parity data destaged to a fourth strip 240b. The track level directory 320 may store an entry for each strip 210b, 220b, 230b, 240b of the stride of the second data set. In one embodiment, the entries of the track level directory 320 are destaged to a stride of a storage device 170. Alternatively, the entries of the track level directory 320 may be stored in semiconductor memory of the controller 160.

In one embodiment, the track level directory 320 comprises one or more data sets distinct from the stride level directory 310. For example, the track level directory 320 may be stored on a first storage device area and the stride level directory 310 stored on a second storage device area. Alternatively, the stride level directory 320 and track level directory 320 share one or more data sets, with stride level directory entries and track level directory entries distinguished by data flags, and words, and the like.

In one embodiment, the strides of the stride level repository 305 are organized sequentially on the storage devices 170. The strides of the track level repository 315 may also be organized sequentially on the storage devices 170. In a certain embodiment, the stride level repository 305 is organized on storage devices 170 that are distinct from the storage devices 170 of the track level repository 315.

In a certain embodiment, the stride level repository 305 and track level repository 315 share common storage devices 170. The strides of the stride level repository 305 may be intermixed with the strides of the track level repository 315. Alternatively, strides of the stride level repository 305 may be segregated from the strides of the track level repository 315 on each storage device 170.

The cache 325 receives write data and temporarily stores the data before the data is destaged to a storage device 170. For example, a client 110 may communicate write data to a controller 160 for storage on a storage device 170. The controller 160 may store the data in the cache 325. In addition, a controller 160 may destage the data to the storage device 170. The cache 325 may be a semiconductor memory. Alternatively, the cache 325 may be a hard disk drive.

The destage module 330 destages the data sequentially to the stride level repository 305 and destages a directory entry for the data to a stride level directory 310 if the data satisfies the repository policy 335. In addition, the destage module 330 may destage the data to the track level repository 315 overwriting an existing data instance and destage the directory entry to a track level directory 320 if the data does not satisfy the repository policy 335. In one embodiment, the destage module 330 comprises executable code stored on a computer usable medium such as the storage devices 170 of FIG. 1 and/or semiconductor memory of the controller 160 and executed by a processor of the controller 160.

The history module 340 stores a history of access to the stride level repository 305 and the track level repository 315. In one embodiment, the history module 340 comprises executable code stored on a computer usable medium such as storage devices 170 and/or semiconductor memory of the controller 160 and executed by a processor of the controller 160.

The repository policy 335 may comprise executable code and data stored on a computer usable medium and executed by a processor of the controller 160. The controller 160 may determine whether or not the repository policy 335 is satisfied, and select either the stride level repository 305 or the track level repository 315 for destaging data as will be described hereafter. An administrator may select the repository policy 335.

In one embodiment, the server 130 manages the controller 160. The server 130 may direct the controller 160 to modify the repository policy 335. In one embodiment, the controller 160 downloads the repository policy 335 from the server 130. The repository policy 335 may be configured as an initialization file.

The schematic flow chart diagram that follows is generally set forth as a logical flow chart diagram. As such, the depicted order and labeled steps are indicative of one embodiment of the presented method. Other steps and methods may be conceived that dare equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
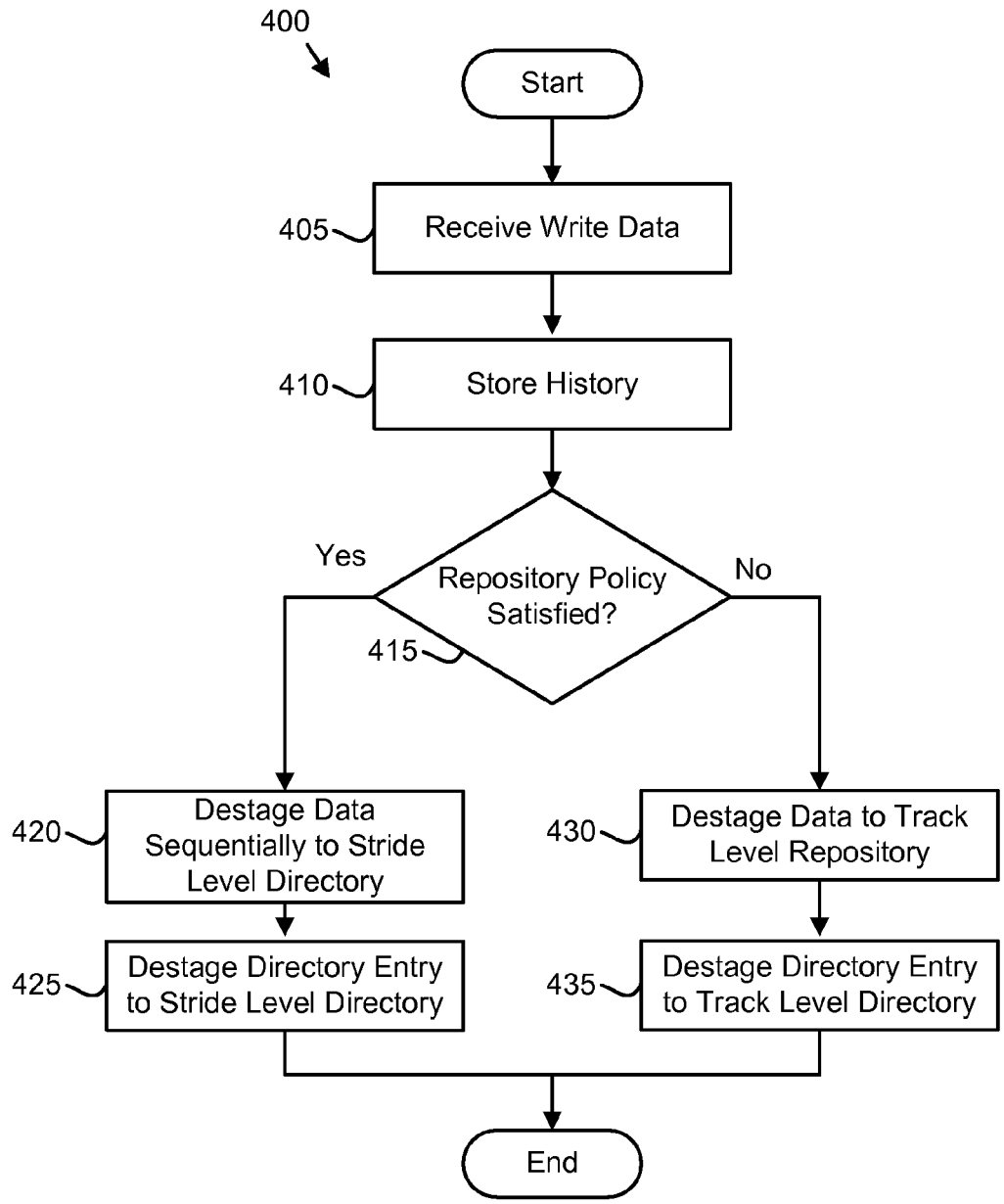
FIG. 4 is a schematic flow chart diagram illustrating one embodiment of a selection method of the present invention.

FIG. 4 is a schematic flow chart diagram illustrating one embodiment of a selection method 400 of the present invention. The method 400 substantially includes the steps to carry out the functions presented above with respect to the operation of the described apparatus and system of FIGS. 1-3. In one embodiment, the method 400 is implemented with a computer program product comprising a computer useable medium having a computer readable program. The computer readable program may be integrated into a computing system, such as the controller 160, wherein the program in combination with the computing system is capable of performing the method 400.

The method 400 starts and the cache 325 receives 405 write data. A client 110 may communicate the write data to the controller 160 for storage on a storage device 170. In one embodiment, the write data comprises modified data of one or more data sets previously retrieved from a storage device 170 through the controller 160 by the client 110.

In one embodiment, the history module 340 stores 410 a history of access to the stride level repository 305 and the track level repository 315. The history may include a record of whether each data set is destaged to the stride level repository 305 or the track level repository 315. In addition, the history may also include data characteristics of each data set destaged to the stride level repository 305 and the track level repository 315. For example, the history may record whether a data set comprises random data, sequentially organized data, data that is read sequentially, compressed data, and the like.

The destage module 330 determines 415 if the repository policy 335 is satisfied. In embodiment, the repository policy 335 is not satisfied for compressed data in the cache 325. For example, the destage module 330 may determine 415 the write data is compressed from write data metadata. The destage module 330 may then determine 415 that the repository policy 335 is not satisfied for the compressed write data.

In one embodiment, the destage module 330 determines 415 that the repository policy 335 is satisfied for sequential data stored in the cache 325. For example, if a data set stored in the cache 325 comprises multiple sequential data tracks, the destage module 330 may determine that the data set is sequential data. As a result, the destage module 330 may determine 415 that the repository policy 335 is satisfied.

In a certain embodiment, the destage module 330 determines 415 that the repository policy 335 is satisfied for random data that is subsequently destaged sequentially. For example, the destage module 330 may project from the history that random data of a data set will be subsequently destaged sequentially. As a result, the destage module 330 may determine 415 that the repository policy 335 is satisfied for the random data.

The destage module 330 may determine 415 that random data satisfies the repository policy 335 if the random data is destaged sequentially. For example, the destage module 330 may extrapolate the history to project that a data set may be sequentially staged. The destage module 330 may therefore determine 415 that the repository policy 335 is satisfied although the data is random because the data will be subsequently staged sequentially.

In one embodiment, the destage module 330 determines 415 that the repository policy 335 is satisfied in response to a software hint from an application. For example, a database application may indicate to the destage module 330 through the software hint that data sets should be destaged sequentially. The hint may be configured as a message communicated as a data packet. Alternatively, the hint may comprise specified data words in metadata of a data set.

In one embodiment, the application may provide the software hint when initializing communication with the controller 160. Alternatively, the application may provide the software hint each time the application writes data from a client 110 to the controller 160.

In an alternate embodiment, the destage module 330 determines 415 that a specified client 110 always satisfies the repository policy 335. In addition, the destage module 330 may determine 415 that a specified client 110 never satisfies the repository policy 335.

In one embodiment, the destage module 330 may modify the repository policy 335. The destage module 330 may modify the repository policy 335 based on bandwidth of the data storage system 100, a time of day, a day of the week, and a fullness of the storage devices 170 of the data storage system 100. For example, the destage module 330 may modify the repository policy 335 so that the repository policy 335 is always satisfied when the bandwidth of the data storage system 100 exceeds and bandwidth threshold.

An alternate example, the destage module 330 may modify the repository policy 335 so that the repository policy 335 is not satisfied between the hours of 12 a.m. and 4 a.m. each morning. Similarly, the destage module 330 may modify the repository policy 335 so the repository policy 335 is not satisfied on weekends.

If the repository policy 335 is satisfied, the destage module 330 destages 420 the data sequentially to the stride level repository 330. The strides receiving the data may not store a previous instance of the data. For example, the data may have been previously staged from a first set of strides. The destage module 330 then sequentially destages 420 the modified data to a second set of strides. As a result, the data may be destaged efficiently and rapidly.

The sequential strides may be included in the stride level repository 330. Alternatively, the sequential strides may be assigned to the stride level repository 330 after the data is destaged 420 to sequential strides.

In addition, the destage module 330 destages 425 a directory entry for the data to the stride level directory 310 and the method 400 ends. For example, the destage module 330 may destage a directory entry for each stride receiving data and/or parody data. The directory entry may be destaged to a storage device 170. Alternatively, the directory entry may be destaged to a semiconductor memory.

In one embodiment, the destage module 330 destages 420 the data to the stride level repository 305 and destages 425 the directory entry for the data to the stride level directory 310 for each write after the repository policy is satisfied for a first write. The destage module 330 may continue to destage 420 the data to the stride level repository 305 and destage 425 the directory entry for the data to the stride level directory 310 until the repository policy 335 is not satisfied for a specified number of writes.

For example, the destage module 330 may destage 420 first data to the stride level repository 305 and destage 425 a directory entry for the first data to the stride level directory 310 if the first data satisfies the repository policy 335. The destage module 330 may destage 420 second data to the stride level repository 305 and destage 425 a directory entry for the second data to the stride level directory 310 although the second data does not satisfy the repository policy 335. In addition, the destage module 330 may continue to destage 420 data to the stride level repository 305 and destage 425 directory entries for the data to the stride level directory 310 until the repository policy 335 is not satisfied by three sets of write data. The destage module 330 may then destage 430 data to the track level repository 315 as is described hereafter.

If the repository policy 335 is not satisfied, the destage module 330 destages 430 the data to the track level repository 315, overwriting an existing data instance. For example, a data instance may have been staged from a first set of strides. The destage module 330 may destage 430 the modified data to the first set of strides, overriding the existing data instance.

The destage module 330 further destages 435 the directory entry to the track level directory 320 and the method 400 ends. In one embodiment, the destage module 330 does not destage a new directory entry to the track level directory 320 if the new directory entry is identical to a previous directory entry for the data.

The method 400 selects between the stride level repository 305 and the track level repository 315 in order to use storage space on the storage devices 170 and data storage system bandwidth most efficiently. For example, if the repository policy 335 is not satisfied, the destage module 330 destages 430 data to the track level repository 315 as it is not necessary to sequentially destage the data. Alternatively, if the repository policy is satisfied the destage module 330 destages 420 the data to the stride level repository 305 for efficiency in destaging and staging the data.

FIG. 5 is a schematic block diagram illustrating one embodiment of cache data 500 of the present invention. The data may reside in the cache 325 of FIG. 3. The description of the data 500 refers to elements of FIGS. 1-4, like numbers referring to like elements. The data 500 includes one or more data tracks 505. In the depicted example, the data tracks 505 are from a common file or data set.

The data tracks 505 are example of sequential data. The data 505 may be efficiently destaged sequentially to the stride level repository 305. Sequentially destaging the data 505 may further allow the data 505 to be efficiently staged sequentially from the storage devices 170.

FIG. 6 is a schematic block diagram illustrating one alternate embodiment of cache data 600 of the present invention. The data may reside in the cache 325 of FIG. 3. The description of the data 600 refers to elements of FIGS. 1-4, like numbers referring to like elements. The data 600 includes one or more data tracks 605, 610, 615. In the depicted example, the data tracks 605, 610, 615 are from three distinct Lyle sort data sets.

The data tracks 605, 610, 615 are exemplary of random data. The data tracks 605, 610, 615 may be efficiently destaged to the storage devices 170 overwriting previous instances of the data tracks 605, 610, 615.

For example, instances of data track 6 of file 1 605, data track 5 of file 2 610, data track 9 of file 3 615a, and data track 8 of file 3 615d may each have been staged from one or more storage devices 170. The destage module 330 may subsequently destage 430 modified instances data track 6 of file 1 605, data track 5 of file 2 610, data track 9 of file 3 615a, and data track 8 of file 3 615d overwriting previous instances. The data tracks 605, 610, 615 may be efficiently destaged to the track level repository 315 as destaging the data tracks 605, 610, 615 sequentially to the stride level repository 305 may consume excessive storage space.

The present invention selects either a stride level repository or a track level repository to receive destaged data. In addition, the present invention may support efficient storage and retrieval of the data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable program stored on a tangible storage device, wherein the computer readable program when executed on a computer causes the computer to:

receive write data at a cache;

destage the write data sequentially to a coarse grained repository and destage a directory entry for the write data to a coarse grained directory for each write in response to a first write of first write data satisfying a repository policy and until the repository policy is not satisfied for a specified number of writes of subsequent data after the first write, wherein the coarse grained repository does not store a previous instance of the write data; and destage the write data to a fine grained repository overwriting an existing instance of the write data and destage the directory entry to a fine grained directory if the write data does not satisfy the repository policy for at least one of the first write and the specified number of writes subsequent to the first write, wherein the fine grained repository stores a previous instance of the write data.

2. The computer program product of claim 1, wherein the repository policy is not satisfied for compressed data in the cache.

3. The computer program product of claim 1, wherein the repository policy is satisfied for sequential data in the cache.

4. The computer program product of claim 1, wherein the repository policy is satisfied for random data that is subsequently destaged sequentially.

5. The computer program product of claim 1, wherein the repository policy is satisfied for random data that is staged sequentially.

6. The computer program product of claim 1, wherein a software hint from an application satisfies the repository policy.

7. The computer program product of claim 1, wherein the computer readable program is further configured to cause the computer to store a history of access to the coarse grained repository and the fine grained repository.

8. The computer program product of claim 7, wherein the repository policy is satisfied if an extrapolation of the history indicates that the write data will be staged sequentially.

9. The computer program product of claim 1, wherein an administrator selects the repository policy.

10. The computer program product of claim 1, wherein the coarse grained repository and the fine grained repository each comprise strides from a common data storage system.

11. An apparatus for selecting a repository, the apparatus comprising:
a cache receiving write data;
a tangible storage device storing a computer readable program;
a processor executing the computer readable program, the computer readable program comprising:
a destage module destaging the write data sequentially to a coarse grained repository and destaging a directory entry for the write data to a coarse grained directory for each write in response to a first write of first write data satisfying a repository policy and until the repository policy is not satisfied for a specified number of writes of subsequent data after the first write, wherein the coarse grained repository does not store a previous instance of the data; and
the destage module further destaging the write data to a fine grained repository overwriting an existing instance of the write data and destaging the directory entry to a fine grained directory if the write data does not satisfy the repository policy for at least one of the first write and the specified number of writes subsequent to the first write, wherein the fine grained repository stores a previous instance of the write data.

12. The apparatus of claim 11, wherein the repository policy is not satisfied for compressed data in the cache.

13. The apparatus of claim 11, wherein the repository policy is satisfied for sequential data, random data that is subsequently destaged, random data that is staged sequentially, and in response to a software hint from an application.

14. The apparatus of claim 13, the computer readable program further comprising a history module storing a history of access to the coarse grained repository and the fine grained repository, wherein the repository policy is satisfied if an extrapolation of the history indicates that the write data will be staged sequentially.

15. A system for selecting a repository, the system comprising:
a plurality of storage devices storing data and organized as a stride level repository and a track level repository;
a controller managing the storage devices and comprising a cache receiving write data;
a destage module destaging the write data sequentially to the stride level repository and destaging a directory entry for the write data to a stride level directory for each write in response to a first write of first write data satisfying a repository policy and until the repository policy is not satisfied for a specified number of writes of subsequent data subsequent after the first write, wherein the coarse grained repository does not store a previous instance of the write data; and
the destage module further destaging the write data to the track level repository overwriting an existing instance of the write data and destage the directory entry to a track level directory if the write data does not satisfy the repository policy for at least one of the first write and the specified number of writes subsequent to the first write, wherein the fine grained repository stores a previous instance of the write data.

16. The system of claim 15, wherein the repository policy is not satisfied for compressed data in the cache.

17. The system of claim 15, wherein the repository policy is satisfied for sequential data in the cache, random data that is subsequently destaged, random data that is staged sequentially, and in response to a software hint from an application.

18. The system of claim 15, further comprising a server managing the controller.

19. A method for deploying computer infrastructure, comprising integrating a computer readable program stored on a tangible storage device into a computing system, wherein the program in combination with the computing system is capable of performing the following:
receiving write data at a cache;
storing a history of access to a stride level repository and a track level repository;
destaging the write data sequentially to the stride level repository and destaging a directory entry for the write data to a stride level directory for each write in response to a first write of first write data satisfying a repository policy and until the repository policy is not satisfied for a specified number of writes of subsequent data subsequent after the first write,
destaging the write data to the track level repository overwriting an existing instance of the write data and destaging the directory entry to a track level directory if the data does not satisfy the repository policy for at least one of the first write and the specified number of writes subsequent to the first write, wherein the track level repository stores a previous instance of the write data.

* * * * *